(12) United States Patent
Clinton et al.

(10) Patent No.: US 8,144,425 B2
(45) Date of Patent: Mar. 27, 2012

(54) MAGNETIC RECORDING HEAD WITH COMPACT YOKE

(75) Inventors: Thomas W. Clinton, Pittsburgh, PA (US); Werner Scholz, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1274 days.

(21) Appl. No.: 11/354,684

(22) Filed: Feb. 15, 2006

(65) Prior Publication Data
US 2006/0132971 A1 Jun. 22, 2006

Related U.S. Application Data

(63) Continuation-in-part of application No. 10/736,358, filed on Dec. 15, 2003, now Pat. No. 7,149,055.

(51) Int. Cl.
*G11B 5/127* (2006.01)
(52) U.S. Cl. .................................. 360/125.01
(58) Field of Classification Search ............ 360/125.01, 360/125.02, 125.03
See application file for complete search history.

(56) References Cited

U.S. PATENT DOCUMENTS

| | | | | |
|---|---|---|---|---|
| 2,862,066 A * | 11/1958 | Thiele | | 360/123.01 |
| 3,686,468 A * | 8/1972 | Garnier, Jr. | | 360/125.01 |
| 4,882,635 A * | 11/1989 | Sanai | | 386/81 |
| 5,057,957 A * | 10/1991 | Ito et al. | | 360/123.17 |
| 5,073,836 A * | 12/1991 | Gill et al. | | 360/317 |
| 5,319,270 A * | 6/1994 | Tanaka et al. | | 310/67 R |
| 5,406,434 A * | 4/1995 | Amin et al. | | 360/125.44 |
| 5,436,779 A * | 7/1995 | Valstyn | | 360/318 |
| 5,490,028 A * | 2/1996 | Ang et al. | | 360/125.35 |
| 5,581,429 A * | 12/1996 | Furuichi et al. | | 360/125.52 |
| 5,682,284 A * | 10/1997 | George | | 360/322 |
| 5,715,597 A * | 2/1998 | Aylwin et al. | | 29/603.08 |
| 5,923,583 A * | 7/1999 | Womack | | 365/171 |
| 6,008,969 A * | 12/1999 | Imai et al. | | 360/125.35 |
| 6,391,483 B1 * | 5/2002 | Zhu et al. | | 428/810 |
| 6,579,625 B1 * | 6/2003 | Engel et al. | | 428/611 |
| 6,621,659 B1 * | 9/2003 | Shukh et al. | | 360/125.43 |
| 6,646,820 B1 * | 11/2003 | Ishida et al. | | 360/17 |
| 6,646,828 B1 * | 11/2003 | Sasaki | | 360/125.43 |
| 6,665,136 B2 | 12/2003 | Clinton et al. | | 360/55 |
| 6,717,770 B1 * | 4/2004 | Crawford | | 360/123.11 |
| 6,742,241 B1 * | 6/2004 | Sasaki | | 29/603.07 |
| 6,906,369 B2 * | 6/2005 | Ross et al. | | 257/295 |
| 6,956,257 B2 * | 10/2005 | Zhu et al. | | 257/295 |
| 7,002,839 B2 * | 2/2006 | Kawabata et al. | | 365/171 |

(Continued)

FOREIGN PATENT DOCUMENTS

JP 07006303 A * 1/1995

(Continued)

OTHER PUBLICATIONS

F. Giesen et al., "Hysteresis and Control of Ferromagnetic Resonances in Rings", Jun. 2005, Applied Physics Letter 86 downloaded see http://apl.aip.org/apl/copyright.jsp, pp. 1-3.

(Continued)

*Primary Examiner* — Brian Miller
(74) *Attorney, Agent, or Firm* — Alan G. Rego; Westman, Champlin & Kelly, P.A.

(57) ABSTRACT

A compact magnetic recording head is provided. The recording head includes a write pole and a substantially planar yoke, which is coupled to the write pole. The yoke is configured to support a substantially single vortex configuration of magnetization.

9 Claims, 10 Drawing Sheets

U.S. PATENT DOCUMENTS

| | | | |
|---|---|---|---|
| 7,099,185 B2 * | 8/2006 | Yamamoto et al. | 365/158 |
| 7,212,367 B2 * | 5/2007 | Clinton et al. | 360/55 |
| 7,291,892 B2 * | 11/2007 | Min et al. | 257/421 |
| 7,356,909 B1 * | 4/2008 | Min et al. | 29/603.16 |
| 7,394,619 B2 * | 7/2008 | Nikitin | 360/118 |
| 7,397,633 B2 * | 7/2008 | Xue et al. | 360/125.3 |
| 7,580,228 B1 * | 8/2009 | Lauer | 360/324.12 |
| 7,593,184 B2 * | 9/2009 | Clinton et al. | 360/125.01 |
| 7,697,243 B1 * | 4/2010 | Novosad et al. | 360/324 |
| 7,889,458 B2 * | 2/2011 | Hsiao et al. | 360/125.3 |
| 8,023,317 B2 * | 9/2011 | Clinton et al. | 365/158 |
| 2004/0021985 A1 * | 2/2004 | Pokhil et al. | 360/126 |
| 2004/0169950 A1 | 9/2004 | Clinton et al. | 360/55 |

FOREIGN PATENT DOCUMENTS

JP      07021518 A  *  1/1995

OTHER PUBLICATIONS

M. Klaui et al., "Vortex Formation in Narrow Ferromagnetic Rings", 2003, IOP Publishing Ltd., Journal of Physics: Condensed Matter, pp. 985-1023.

* cited by examiner

FIG. 5

MAGNETIC RECORDING HEAD WITH COMPACT YOKE

The present application is a continuation-in-part of U.S. patent application Ser. No. 10/736,358, filed Dec. 15, 2003, entitled "INDUCTIVE WRITE HEAD DRIVEN ONLY BY AN AMPERE WIRE," the content of which is hereby incorporated by reference in its entirety.

FIELD OF THE INVENTION

The present invention relates generally to magnetic recording heads, and more particularly but not by limitation to magnetic recording heads with compact yokes.

BACKGROUND OF THE INVENTION

As bit-areal densities in magnetic recording continue to progress in an effort to increase the storage capacity of devices, such as hard disc drives, magnetic transition (bit) dimensions and, concomitantly, recording head critical features are being pushed below 100 nm. This trend has conflicting consequences for magnetic write heads (or writers), in that smaller bits drive data rates higher, requiring faster magnetization dynamics of the writer, while at smaller pole dimensions it is harder to drive the magnetization faster. This stems from a traditional writer being driven by a set of coils wrapped around a relatively wide yoke and positioned well behind an air bearing surface (ABS) and a relatively narrow pole. The coil drives flux from the wide yoke through the narrow pole to magnetize the pole at the ABS. There is a resulting flux bottleneck at the narrow pole that slows the magnetization, and corresponding write-field, dynamics down. Data rates of a GHz and beyond require magnetic timescales (rise time, reversal time, and relaxation time) of a fraction of a nanosecond. At these frequencies, the magnetization dynamics of a traditional inductive (coil-driven) writer are reaching their limits, and the present writer technology will soon impede further advances in data rates. Accordingly, there is a need for a recording head, with reduced critical feature sizes, that is capable of writing at higher areal densities and the corresponding higher data rates.

SUMMARY OF THE INVENTION

The present embodiments relate to magnetic recording heads with compact critical feature sizes which address the above-mentioned needs.

A compact magnetic recording head is provided. The recording head includes a write pole and a substantially planar yoke, which is coupled to the write pole. The yoke is configured to support a substantially single vortex configuration of magnetization.

These and other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, magnetic recording heads employ yokes that are configured to support a substantially single vortex configuration of magnetization. Before describing the present invention in greater detail, one illustrative embodiment in which the present invention can be used will be discussed.

Figure 1:
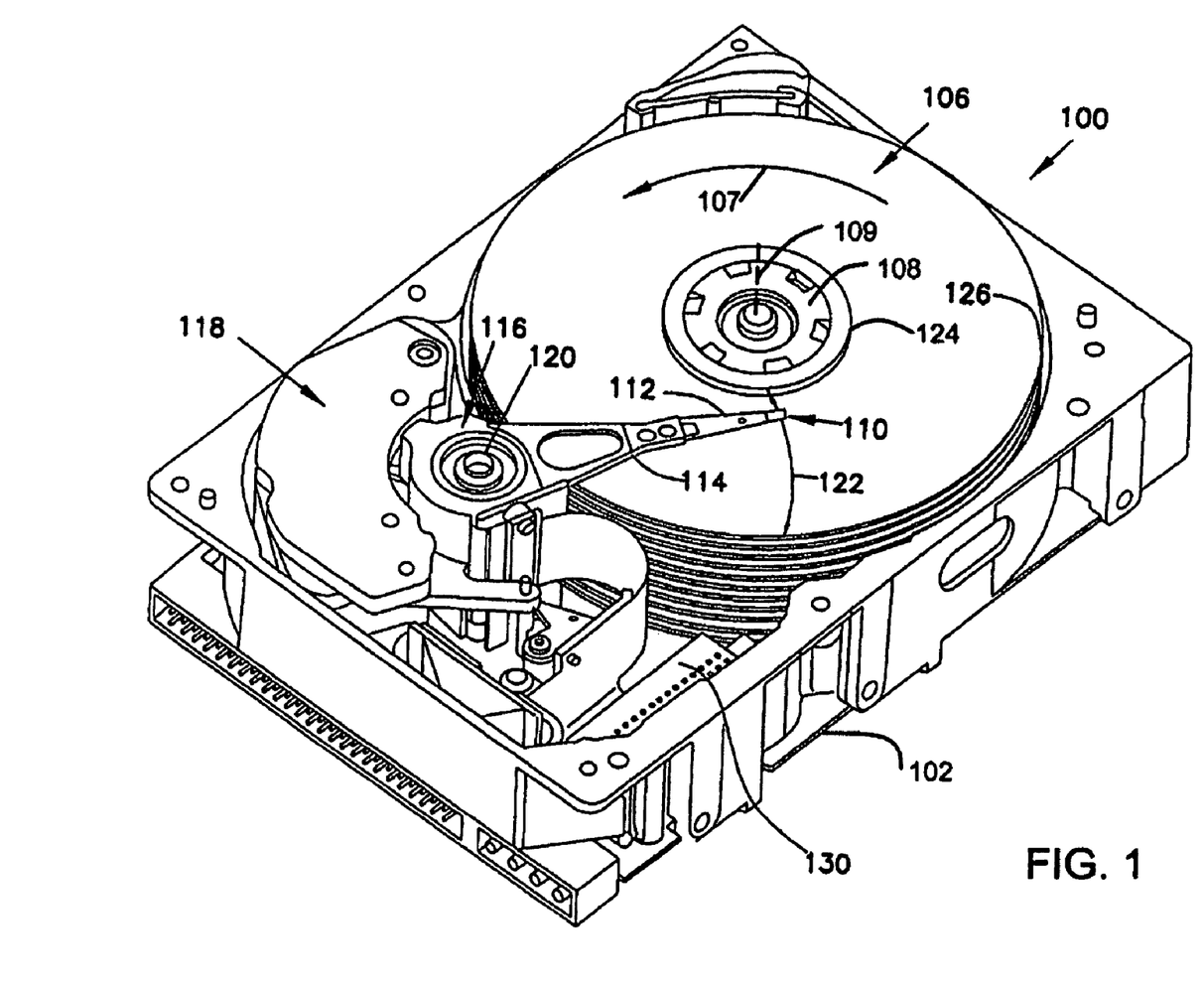
FIG. 1 is an isometric view of a disc drive.

Referring now to FIG. 1, an isometric view of a disc drive 100 in which embodiments of the present invention are useful is shown. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Heads 110 can include compact magnetic recording heads constructed in accordance with embodiments of the present invention, which are described below.

Figure 2:
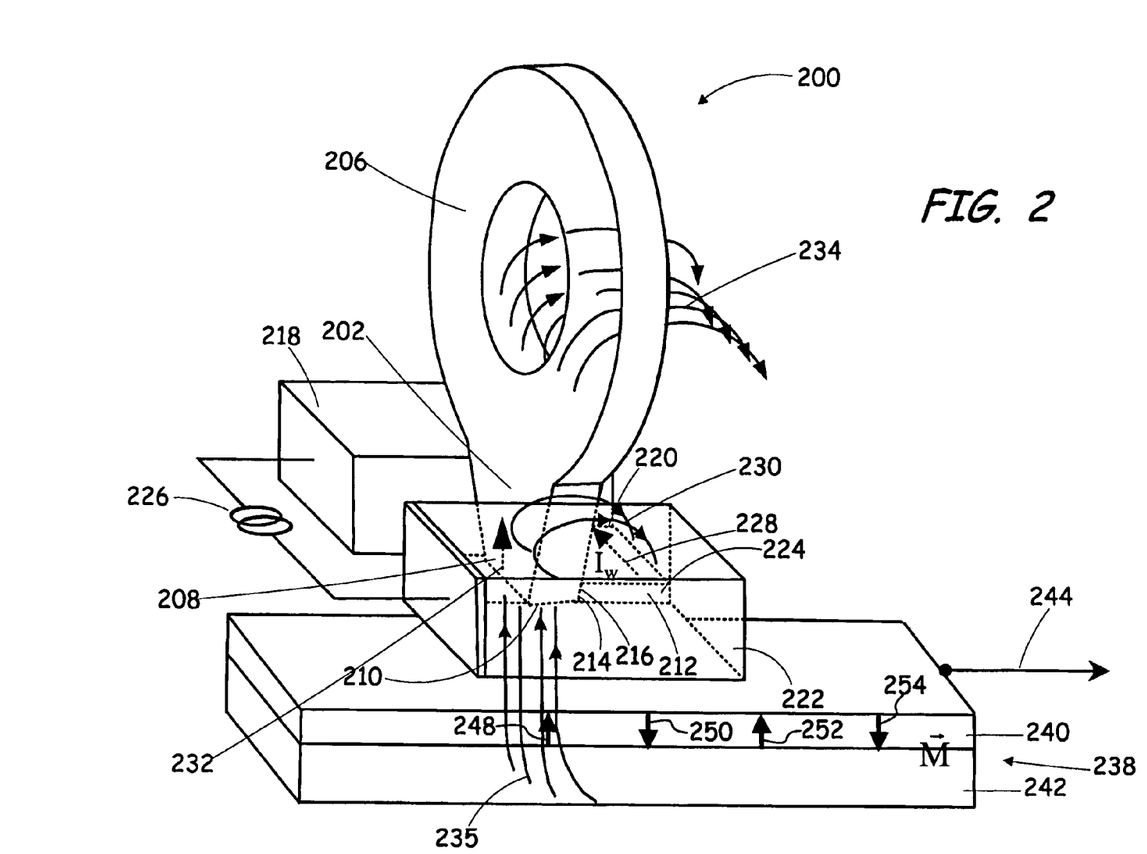
FIG. 2 is a pictorial representation of a magnetic recording head constructed in accordance with an embodiment of the present invention.

Referring now to FIG. 2, a pictorial representation of a magnetic recording head 200 constructed in accordance with an embodiment of the present invention is shown. Recording head 200 includes a write pole 202, a yoke 206 and other components, which are described further below. In accordance with the present invention, yoke 206 has a substantially planar configuration and is configured to support a substantially single vortex configuration of magnetization. Details regarding different embodiments of the yoke are provided further below.

As can be seen in FIG. 2, yoke 206 and write pole 202 are coupled together (or formed integrally together). A tip 208 of write pole 202 is positioned adjacent to an air bearing surface (ABS) 210 of recording head 200. A conductor 212 has a rectangular cross-section and is positioned adjacent to write pole 202 at ABS 210. An edge 214 of conductor 212 is positioned adjacent to an edge 216 of write pole 202. A first electrical contact/heat sink 218 is electrically connected to a first end 220 of conductor 212. A second electrical contact/heat sink 222 is electrically connected to a second end 224 of conductor 212. The electrical contact/heat sinks 218 and 222 are coupled to a current source 226. Current from source 226 flows through electrical contact/heat sinks 218 and 222 and conductor 212 as illustrated by arrow 228. This current creates a magnetic field around conductor 212 as illustrated by arrows 230. The magnetic field induces a magnetic field in write pole 202, which passes through yoke 206 as illustrated by arrows 232 and 234, and returns to pole 202 as illustrated by arrows 235. Insulation can be inserted to electrically isolate write pole 202 from conductor 212 and the contact/heat sinks 218 and 222. In operation, ABS 210 of recording head 200 is positioned adjacent to a recording medium 238, which can include a magnetically hard recording layer 240 and a magnetically soft underlayer 242. As recording medium 238 moves as illustrated by arrow 244, the direction of magnetization of magnetic domains 248, 250, 252 and 254 in recording layer 240 is affected by the magnetic field in the vicinity of write pole tip 208.

As noted above, recording head 200 is energized and field-amplified by conductor (or wire) 212 positioned adjacent to write pole 202 at ABS 210. Such a write head is referred to as a Wire Amplified Magnetic Recording (WAMR) head. The conductor (such as 212) in a WAMR head is referred to as an Ampere wire.

In general, due to the finite thickness t (represented by reference numeral 227 in FIG. 2) of the Ampere wire (in a downtrack direction) and its location at the trailing edge of the write pole, the magnetic field generated by the Ampere wire has a strong influence on the downtrack field gradient of the WAMR head. In order to achieve desired field gradients, the thickness of the Ampere wire has to be chosen suitably, where smaller thickness leads to improved field gradients. However, the wire thickness is limited by problems associated with the increasing current density, if the total current through the Ampere wire and its stripe height (the width on top of the write pole, which is represented by reference numeral 225 in FIG. 2) are kept constant. Very thin wires lead to high resistance, high current densities, and high power dissipation, which can result in reliability problems.

Therefore, the following stripe-height selection scheme has been determined:
1. The maximum allowable current $I_{max}$, which is available from a current source that is connected to the Ampere wire, is drawn. This is desirable, because the field, which is generated by the Ampere wire, is directly proportional to the current through the wire.
2. The wire thickness t is adjusted to obtain a suitable field gradient while keeping t as large as possible. The value for the field gradient depends on the complete disc drive design including the recording media and channel (not shown).
3. The wire stripe height s is then determined by the maximum current density j, which the Ampere wire can sustain reliably. Thus, the stripe height is given by $s=I_{max}/(j*t)$.

This scheme makes substantially certain, that the Ampere wire delivers the maximum field while the specifications for the field gradient are met and the reliability of the Ampere wire is substantially ensured.

As mentioned above, yoke 206 has a generally planar configuration and supports a substantially single vortex configuration of magnetization. Although the substantially planar configuration of yoke 206 is especially suitable for the above-described WAMR head, the present invention applies to any recording head that employs a substantially planar yoke and supports a substantially single vortex configuration of magnetization. Details regarding different embodiments of substantially planar yokes in accordance with the present invention are provided below in connection with FIGS. 3A-3F and 4.

The yoke designs shown in FIGS. 3A-3F and 4 are based on certain observations and findings in connection with circular magnetic elements. In general, a vortex magnetic state (state in which the magnetic flux is closed) can be established in circular magnetic elements. The vortex magnetic state, which is a substantially zero stray field state, has been found to be stable in discs and ring magnetic elements. Further, certain configurations of disc and ring magnetic elements have essentially zero remanence, and can be engineered to be non-hysteretic, which simplifies the magnetization dynamics. Also, discs and ring magnetic elements have been found to be scalable to sub-100 nm sizes.

Figure 3A:
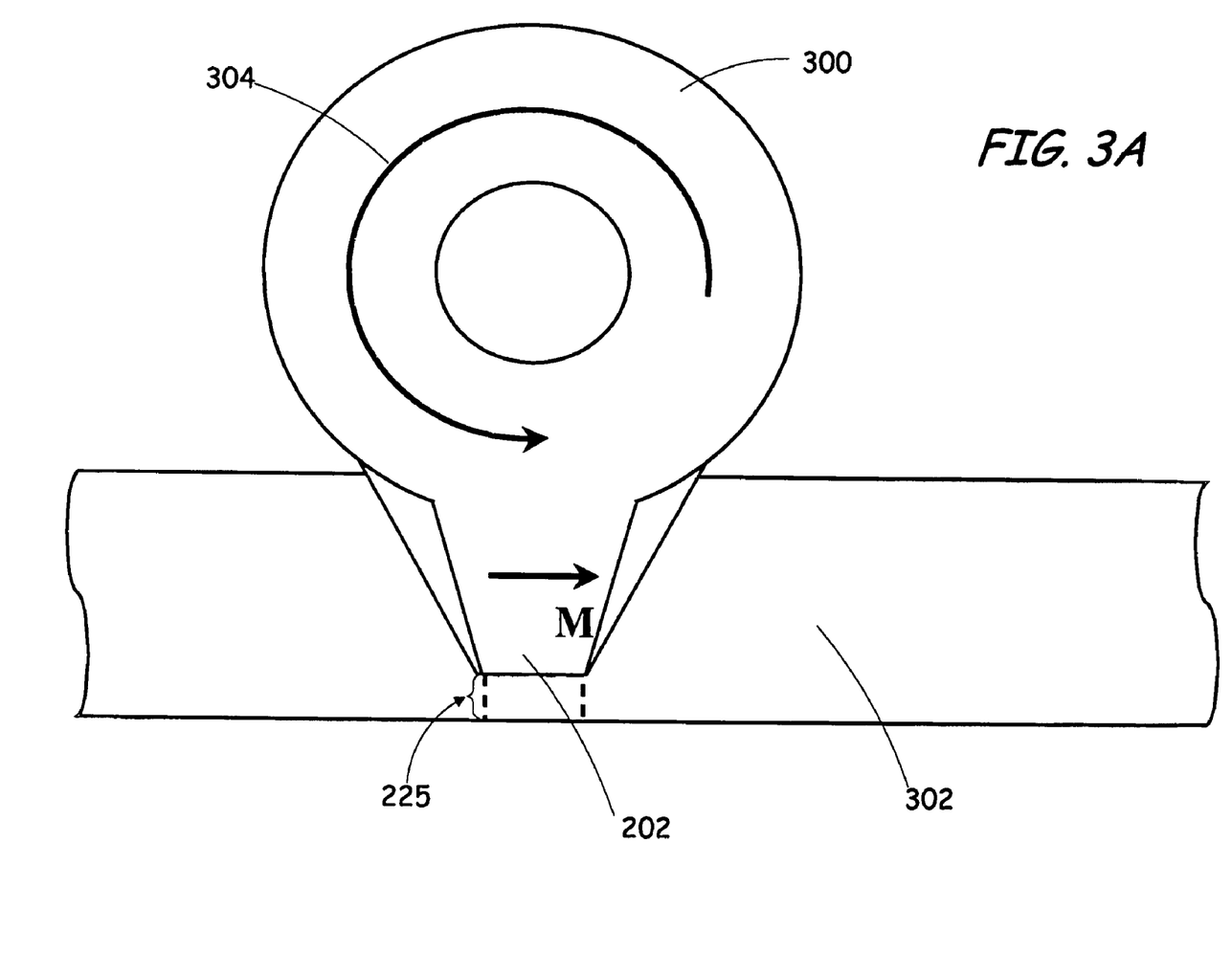
FIGS. 3A-3F are schematic representations of ring-like yoke embodiments of the present invention.
Figure 3B:
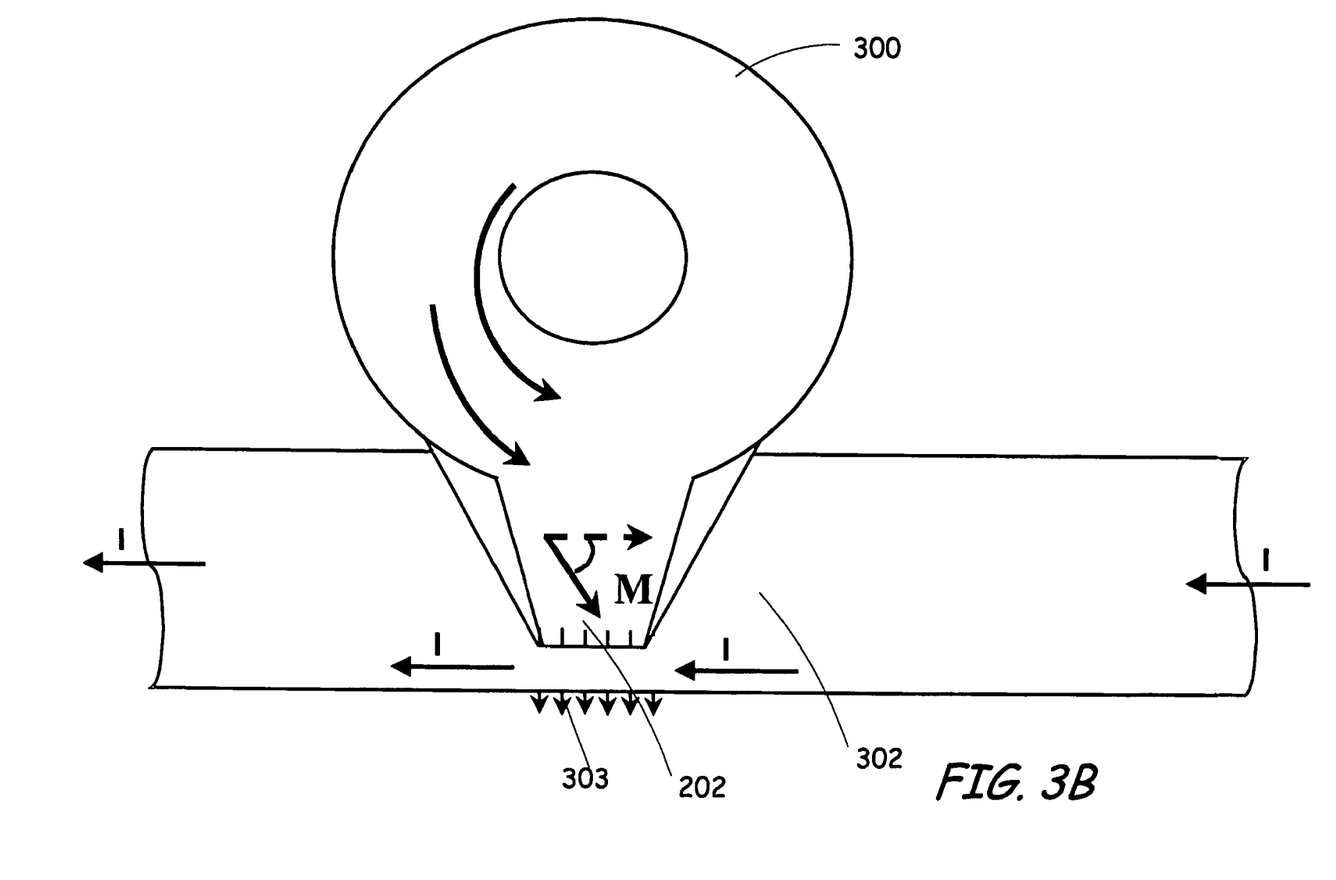

Based on the above observations and findings, yoke designs, in which highly-stable vortex magnetic states can be established, are provided in accordance with embodiments of the present invention. FIGS. 3A and 3B are schematic diagrams showing a ring-like yoke 300 coupled to, or integrated with, write pole 202 to form a keyhole-like (e.g., keyhole-shaped) structure in accordance with an embodiment of the present invention. Also shown in FIGS. 3A and 3B is element 302, which represents an ampere wire and electrical contacts/heat sinks of a WAMR head. The magnetization state with its rotational (vortex) symmetry is also schematically depicted in FIG. 3A and denoted by reference numeral 304. As mentioned above, this magnetization state has essentially zero remanence, and can be engineered to be non-hysteretic, which simplifies the magnetization dynamics. FIG. 3A shows the device in a quiescent state (a state in which no current flows in the Ampere wire and the magnetization M of pole 202 is along an easy-axis). However, FIG. 3B illustrates the device in an energized state (current (I) in the Ampere wire). Here, the magnetization M of pole 202 is along a hard-axis and the dashed line represents the easy-axis. Arrows 303 represent a magnetic field that the current generates on the bottom of the Ampere wire (surface of the Ampere wire adjacent to the pole). Because the vortex magnetization is the minimum energy state in a deep potential well, the magnetization of the structure as a whole is not driven far out of equilibrium when excited, and, thus, the dynamic response can be particularly fast and reversible (non-hysteretic).

Figure 3C:
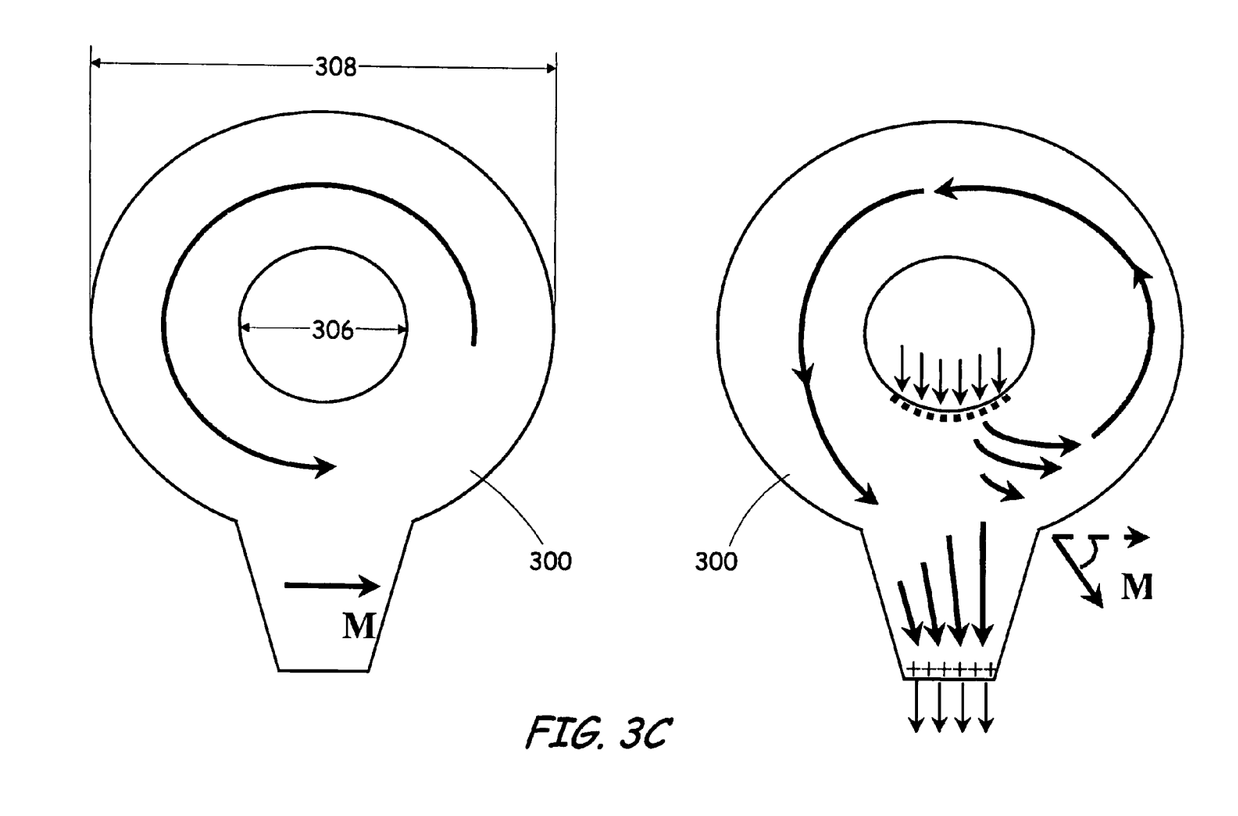
Figure 3D:
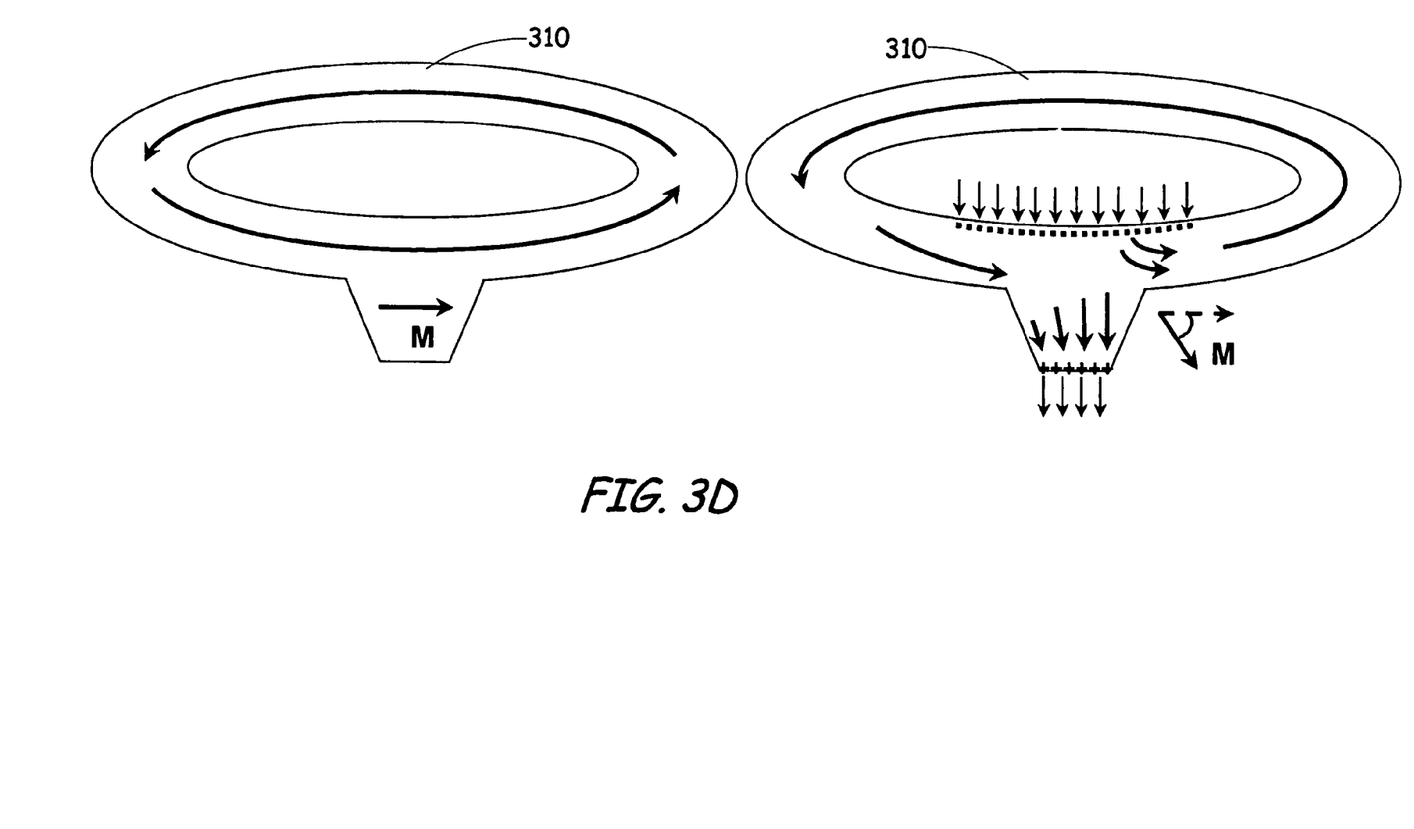

FIG. 3C shows greater detail to how the magnetization essentially behaves when switching from the quiescent state (left-hand schematic) to an excited state (right-hand schematic), as during a write operation. When the writer is energized, the field lines emanating from the pole return through the center of the ring, as depicted in the right-hand schematic of FIG. 3C. The geometry of the ring can be engineered for optimum recording performance by varying an inner diameter 306 and/or an outer diameter 308, and by varying the ring's shape and curvature, such as with the oval geometry shown in FIG. 3D and denoted by reference numeral 310. Also, the pole shape and placement with respect to the yoke can be varied to optimize performance.

Figure 3E:
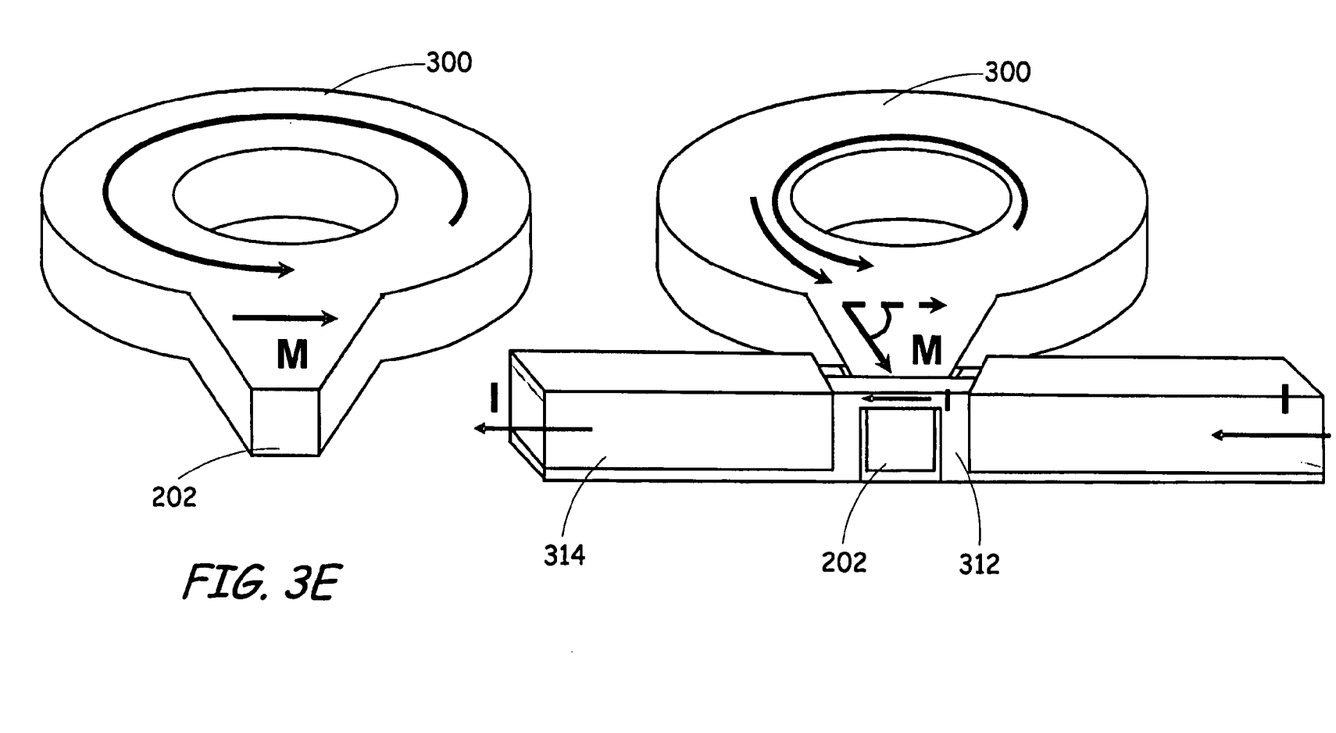
Figure 3F:
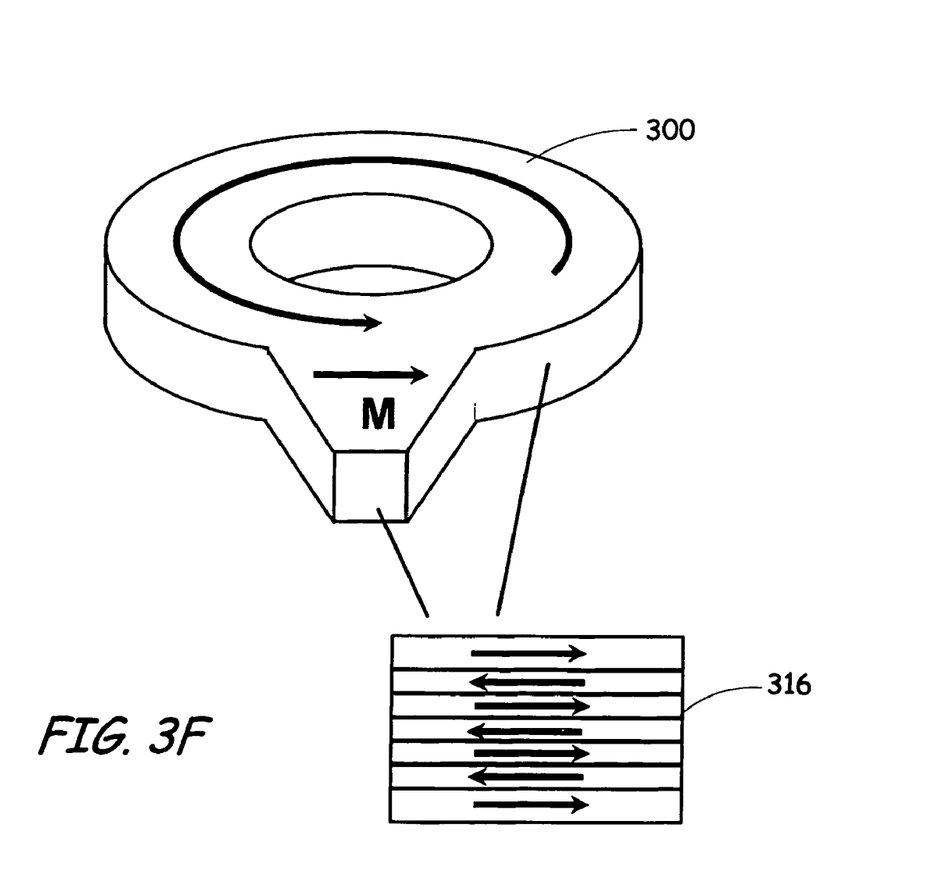

FIG. 3E is a three-dimensional rendering of an embodiment of the present invention showing how the Ampere wire 312 and electrical contacts/heat sinks 314 can readily be integrated with the magnetic structure. FIG. 3F shows that the magnetic material can be a multilayer (shown as multilayer section 316), where magnetic layers (separated by non-magnetic interlayers) are coupled anti-ferromagnetically (by exchange or magnetostatic coupling), so as to encourage low-remanence in the pole, as is known in the field. As mentioned above, the inner and outer diameters (such as 306 and 308, respectively), as well as the material thickness are all parameters that can be engineered to optimize the performance of an annular-ring yoke. The pole dimensions, such as throat height, pole width and shape can be varied to optimize the overall writing performance of a WAMR head. Further, not only can the pole be scaled to very small dimensions (<100 nm) to support high-areal-density writing (>100 Gbit/in$^2$), but the ring-like yoke can also be scaled to sub-100 nm (nano-ring yoke) with no remanence or hysteresis (in a highly-stable vortex-magnetization state).

Figure 4:
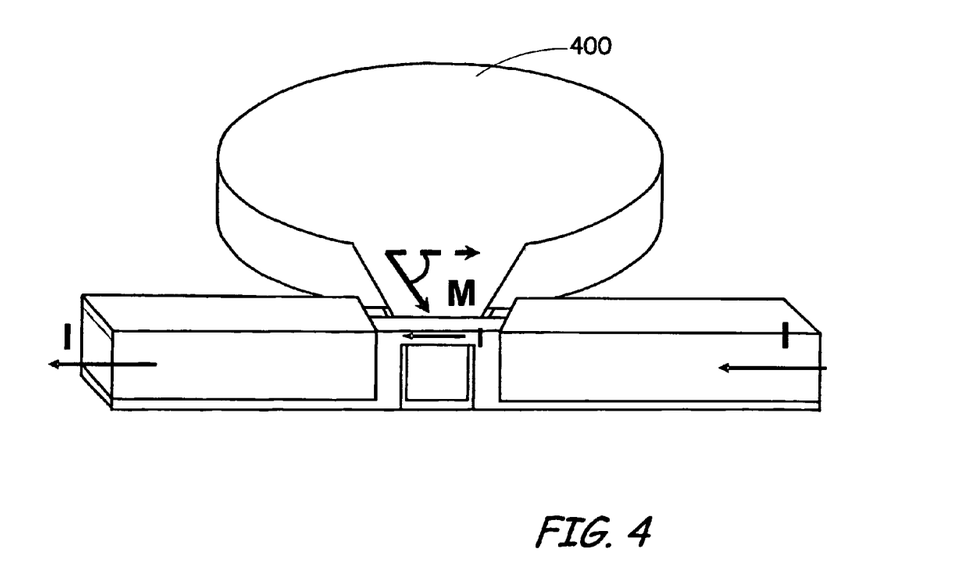
FIG. 4 is a schematic representation of a disc-like (e.g., disc-shaped) yoke embodiment of the present invention.

FIG. 4 is a schematic representation of a disc-like yoke embodiment (represented by reference numeral 400) of the present invention. The lowest energy magnetic state for this geometry is also a vortex, but a vortex core will form in the center of the disk. The disk may be circular or oval and operates in a manner similar to the earlier-described yokes having an annular geometry.

Thus, a substantially planar yoke with an annular disc geometry (FIGS. 2 and 3) or a non-annular disc geometry (FIG. 4) are suitable for forming a compact head in accordance with the present invention. However, the present invention applies to any recording head that employs a substantially planar yoke and supports a substantially single vortex configuration of magnetization.

Figure 5:
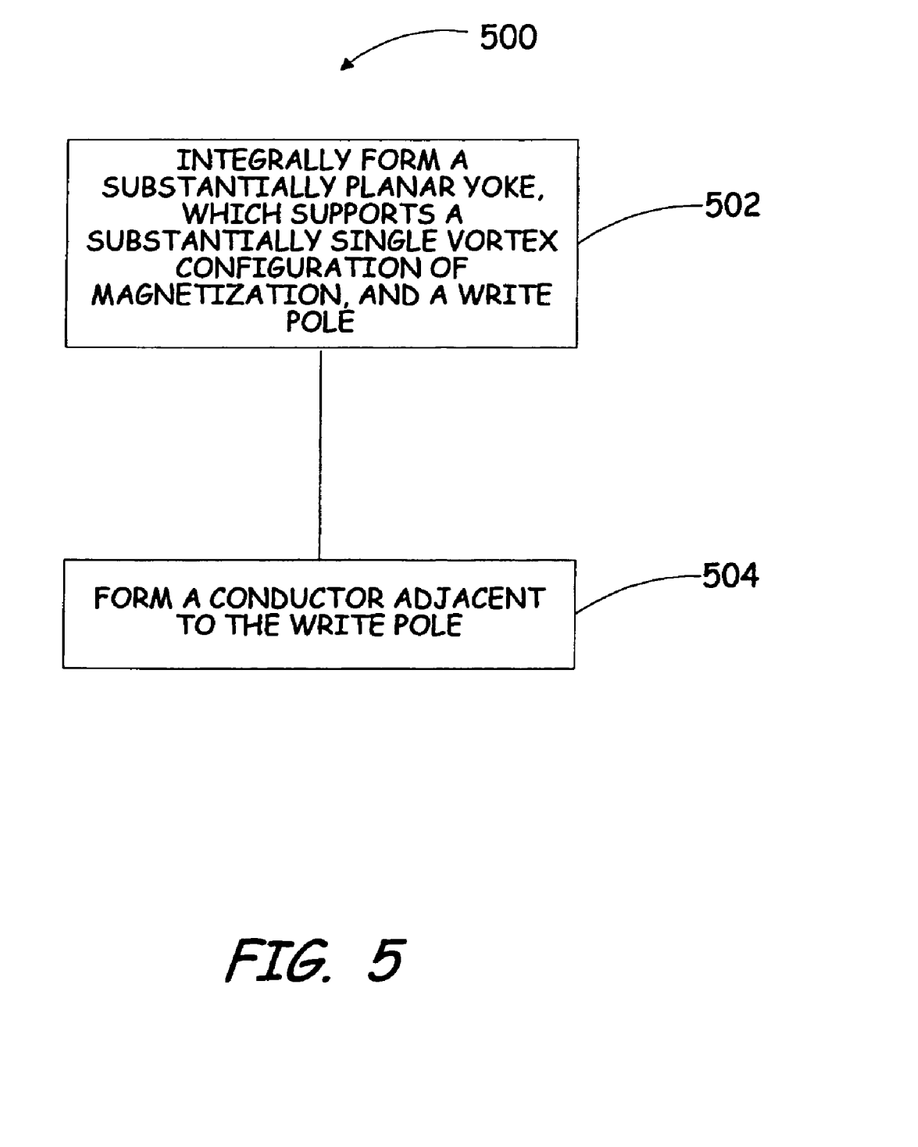
FIG. 5 is a simplified flowchart showing primary steps involved in forming a recording head in accordance with an embodiment of the present invention.

FIG. 5 is a simplified flowchart 500 showing primary steps involved in forming a recording head in accordance with an embodiment of the present invention. At step 502, a substantially planar yoke, which supports a substantially single vortex configuration of magnetization, and a write pole are integrally formed. At step 504, a conductor is formed adjacent to the write pole. Although the integral formation of the substantially planar yoke and the write pole simplifies the fabrication of a head, in some embodiments, instead of being integrally formed, the write pole and the substantially planar yoke can be formed separately and then coupled together. Different techniques, some of which are set forth above, can be employed to carry out the steps shown in the above flowchart while maintaining substantially the same functionality without departing from the scope and spirit of the present invention.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the recording head while maintaining substantially the same functionality without departing from the scope and spirit of the present invention. In addition, although the preferred embodiment described herein is directed to a wire amplified magnetic recording head for a disc drive, it will be appreciated by those skilled in the art that the teachings of the present invention can be applied to any type of magnetic recording head, without departing from the scope and spirit of the present invention. In addition, the recording heads are not limited to use in disc drives, but could be used in other storage devices wherein a magnetic field is used to affect the magnetization of a magnetic storage medium. Although the preferred yoke embodiments are rings or disks, the present invention relates in general to planar yokes that support a substantially single vortex configuration of magnetization. The above-described embodiments of recording heads are suited for perpendicular recording. However, it will be appreciated by those skilled in the art that the above-described embodiments can relatively easily be modified for longitudinal recording by adding another pole to the recording head such that the ampere wire is between the two poles.

What is claimed is:

1. A recording device comprising:
   only one write pole positioned at an air bearing surface (ABS) of the recording device; and
   a substantially planar disc-shaped yoke coupled to the only one write pole and separated from the ABS by the only one write pole, which is positioned between the yoke and the ABS.

2. The device of claim 1 and further comprising a conductor coupled to the only one write pole.

3. The device of claim 1 wherein the yoke comprises an annulus.

4. The device of claim 3 wherein the annulus is substantially circular.

5. The device of claim 3 wherein the annulus is substantially oval.

6. The apparatus of claim 1 wherein the disc-shaped yoke is non-annular and substantially circular.

7. The apparatus of claim 1 wherein the disc-shaped yoke is non-annular and substantially oval.

8. The device of claim 1 wherein the only one write pole and the yoke are multilayered structures.

9. The device of claim 8 wherein the multilayered structures are combinations of magnetic and non-magnetic layers.

\* \* \* \* \*